United States Patent
Hsiao et al.

(10) Patent No.: US 6,247,023 B1
(45) Date of Patent: Jun. 12, 2001

(54) METHOD FOR PROVIDING DATABASE RECOVERY ACROSS MULTIPLE NODES

(75) Inventors: Hui-I Hsiao, Saratoga; Amy Chang, San Jose, both of CA (US)

(73) Assignee: Internationl Business Machines Corp., Armonk, NY (US)

(*) Notice: Subject to any disclaimer, the term of this patent is extended or adjusted under 35 U.S.C. 154(b) by 0 days.

(21) Appl. No.: 09/120,381

(22) Filed: Jul. 21, 1998

(51) Int. Cl.$^7$ .................................................. G06F 12/00
(52) U.S. Cl. ........................... 707/202; 707/8; 707/10; 707/200; 707/201; 707/203
(58) Field of Search .................................... 707/200, 201, 707/202, 203, 8, 10; 714/4, 19, 20; 709/230; 711/147, 206, 216

(56) References Cited

U.S. PATENT DOCUMENTS

| | | | |
|---|---|---|---|
| 5,201,044 | * | 4/1993 | Frey, Jr. et al. ........................ 714/20 |
| 5,335,343 | * | 8/1994 | Lampson et al. ........................ 714/9 |
| 5,432,926 | * | 7/1995 | Citron et al. ............................. 714/4 |
| 5,799,305 | * | 8/1998 | Bortvedt et al. ........................ 707/10 |
| 6,012,094 | * | 6/2000 | Leymann et al. ..................... 709/230 |

* cited by examiner

Primary Examiner—Thomas Black
Assistant Examiner—Diane D. Mizrahi
(74) Attorney, Agent, or Firm—Kevin M. Jordan; David M. Shofi; Anne Vachon Dougherty

(57) ABSTRACT

A three-phase database crash recovery mechanism is detailed including a forward phase, a backward phase, and a third, so-called "sideward" phase for recovery of transactions which were interrupted at the time of the crash, using Global Transaction IDs to track the status of the transactions at the coordinating and at the participating nodes. Depending upon the status of the transaction at the time of the crash, either a query message to the coordinating node or a vote message to the participating nodes is generated and processed, thereby allowing most interrupted transactions to be completed. Additional implementations are provided for crash recovery, without duplication of efforts, across multiple nodes in a parallel database environment, for cascaded transactions wherein the database recovery at a local node is triggered by database recovery at a remote node in the parallel system, and for concurrent recovery, wherein database recovery is started concurrently at both transaction coordinator and participant nodes.

22 Claims, 3 Drawing Sheets

METHOD FOR PROVIDING DATABASE RECOVERY ACROSS MULTIPLE NODES

FIELD OF THE INVENTION

This invention relates to a parallel data processing environment and more particularly to an efficient mechanism for database recovery across multiple nodes after processor and/or system failure.

BACKGROUND OF THE INVENTION

In a stand-alone system, system failure recovery, also known as crash recovery, usually consists of two standard processing phases: a forward redo phase and a backward undo phase, shown representatively at FIG. 1. Log files, in which are recorded all operations which result in changes to the database state, are replayed to recreate the event sequence for each transaction. The log files for stand-alone systems are stored on local disks, while multi-node systems may have log files stored locally (i.e., where generated) or at a central location. If a commit log record associated with a transaction is found, then the transaction is committed. If no record is found, the transaction is aborted.

The two-step recovery process phases are commonly referred to as forward recovery and backward recovery. In the forward recovery phase (steps 101–103) of FIG. 1, the node scans the log files forward from a point determined by the checkpoint records, at 101, and redoes all operations stored in the local log files (also referred to as the "repeat history") to establish the state of the database right before the system crashed. To redo the operations, the node reapplies the log to the database and refreshes the transaction table, at 102. Once a check, at 103, determines that there are no more logs to process, the backward recovery phase (steps 104–108) is conducted. In the backward recovery phase, all interrupted transactions (a.k.a., "in-flight" transactions) are rolled back (i.e., aborted). A list of all interrupted transactions is obtained at step 104. If the list is empty, as determined at step 105, crash recovery is complete. If the list is not empty, the node scans the logs backward and undoes (i.e., aborts) the interrupted transactions at 106, and then updates the list at 107. The procedure is repeated until the list is empty and the crash recovery is done, as indicated at 108.

In a stand-alone system, the database will become consistent after these two phases of recovery. In a parallel system, however, node failures or other types of severe errors which may occur during commit processing will cause transactions to be out-of-sync across multiple nodes. Recovery across the multiple nodes is not as straightforward as it is in a stand-alone system. Although the standard recovery process for multi-node systems does involve each node independently executing the two-step process, database consistency cannot be guaranteed across nodes, due to the nature of the commit protocol.

In what is referred to herein as the "standard two-part commit protocol," a coordinating node, at which a transaction is executing, first issues a "prepare to commit" message to all participating, or subordinate, nodes. After receipt of responses from all participating nodes, the coordinating node then issues an outcome message in the second phase of the protocol, either a "commit" message if all nodes have sent affirmative responses, or an "abort" message. All participating nodes and the coordinating node must vote "yes" for the coordinating node to commit/complete the transaction. Any "no" response received will result in the aborting of the transaction. In response to the outcome message ("commit" or "abort") generated by the coordinating node, all participating nodes perform local commit procedures or the transaction is aborted. Before issuing a "yes" reply to the coordinating node, each participating node writes a "prepare" log to its local disk. Similarly, before sending the "commit" message to all participating nodes, the coordinating node writes a "commit" log to its local disk. Finally, after local commit processing has been completed, a participating node writes a "commit" log to its local disk and acknowledges the commit transaction completion to the coordinating node. In addition, a transaction table entry for the corresponding transaction is updated at each local node after voting or performing a commit procedure. When the coordinating node receives an acknowledgement from all participating nodes, it removes the corresponding entry from the transaction table, writes a "forget" log record to disk, and "forgets" about the transaction.

For aborted transactions, typically, the protocol will not require that each participating node generated an acknowledgement message to the coordinating node, although such can readily be implemented. Before a forget log is written at the coordinating node, a transaction can be in the committed state, but not yet in the forgotten state. Similarly, a participating node can have prepared to commit, and yet not received the outcome message from the coordinating node. If a crash occurs before the transactions are resolved, the interrupted transactions cannot readily be traced and replayed under the prior art two-phase recovery procedure. Moreover, the transaction may have been committed at one node, and not at another, resulting in database inconsistency across the nodes. What is needed is a process by which a given transaction can be traced to the point of interruption, and also may be "resurrected" for completion.

It is therefore an objective of the invention to provide an improved crash recovery mechanism for database recovery across multiple nodes.

It is another objective of the invention to provide crash recovery which can effectively identify and resolve interrupted transactions.

Yet another objective of the invention is to provide a mechanism by which the database can be accessed before completion of the crash recovery process.

SUMMARY OF THE INVENTION

These and other objectives are realized by the present invention wherein a three phase multi-node crash recovery process is implemented including a forward phase, a backward phase, and a third (so-called "sideward") phase for recovery of transactions which were interrupted at the time of the crash. The novel method uses Global Transaction IDs to track the status of transactions at the coordinating node and/or at one or more of the participating nodes. Depending upon the status of the transaction at the time of the crash, a crash recovery agent at a designated node generates either a query message to the coordinating node or a vote message to at least one participating node. The node which receives the message acts as the sideward recovery agent to process the message and respond to the crash recovery agent, thereby allowing most interrupted transactions to be completed. Additional implementations are provided for crash recovery, without duplication of efforts, across multiple nodes in a parallel database environment, for cascaded transactions wherein the database recovery at a local node is triggered by database recovery at a remote node in the parallel system, and for concurrent recovery, wherein database recovery is started concurrently at both transaction coordinator and participant nodes.

BRIEF DESCRIPTION OF THE DRAWINGS

The invention will now be described in detail with specific reference to the appended figures wherein.

DESCRIPTION OF THE PREFERRED EMBODIMENT

Figure 1:
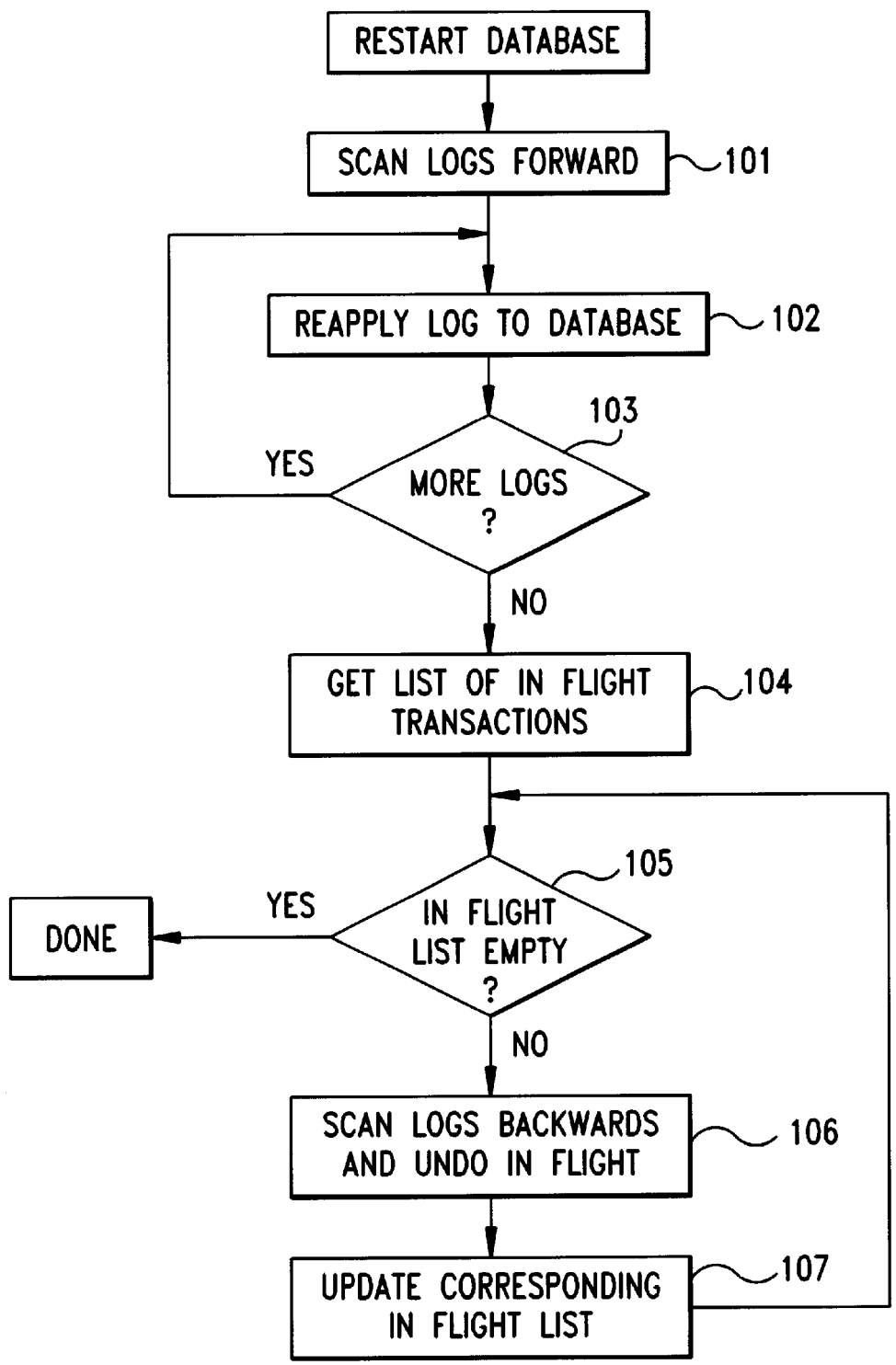
FIG. 1 provides a representative process flow for the prior art two-phase recovery process effective for stand-alone systems.

Under the present invention, the recovery process includes not only forward and backward recovery portions, but also a third phase (hereinafter referred to as "sideward recovery") for resolving in doubt transactions and for resending the transaction outcomes to subordinate nodes when the transaction states are committed. The forward and backward phases are conducted by a designated crash recovery agent at one node, which may have been either the coordinating node or a participating node for the transaction. The sideward recovery phase is conducted at a different node, the so-called "sideward recovery agent," which may also have been either a participating or coordinating node for the transaction at the time of the system crash. Which node, the coordinating node or one of the participating nodes, will be the crash recovery agent for a particular transaction is tied to the status of the transaction at the time of the crash and the order of database recovery after system crash.

A distinction can, and will, be made about the status of transactions for which processing has been interrupted, depending upon the point in the communications/protocol at which the crash occurred. The status of a transaction may be "in doubt", "incomplete" or "in flight", as defined further herein. "In doubt" transactions at participating nodes are those for which, at the time of system crash, a participating node had received a "prepare to commit" message from the coordinating node; the participating node had sent an acknowledgement; but, the participating node had not yet received an outcome message. An "incomplete" transaction at a coordinating node is one for which a "commit" outcome message had been generated by the coordinating node, but the acknowledgement had not been received at the time of the system crash. Under the present inventive method, not only recovery, but complete transaction continuity can be achieved for "in doubt" and "incomplete" transactions. Finally, a class of interrupted transactions, referred to as "in flight" transactions, can be identified (e.g., for which a "prepare to commit" message had been generated, but responses/votes had not been received from all participating nodes). For "in flight" transactions, it is most advantageous to undo (i.e., abort) the database operation, rather than trying to complete it and requiring sideward recovery at each participating node.

The inventive recovery process requires that each node maintain log files and a transaction table, and also that a unique Global Transaction ID, assigned by the coordinating node for the transaction, be included in each file and table entry. The Global Transaction ID, which includes the ID of the coordinating node for the transaction, accompanies the original transaction request and all subsequent intra-node communications regarding that request (through commit and forget or abort). Maintenance of a Global Transaction ID for each transaction will facilitate transaction tracking and implementation of both the backward and sideward recovery phases of the present invention.

Figure 2:
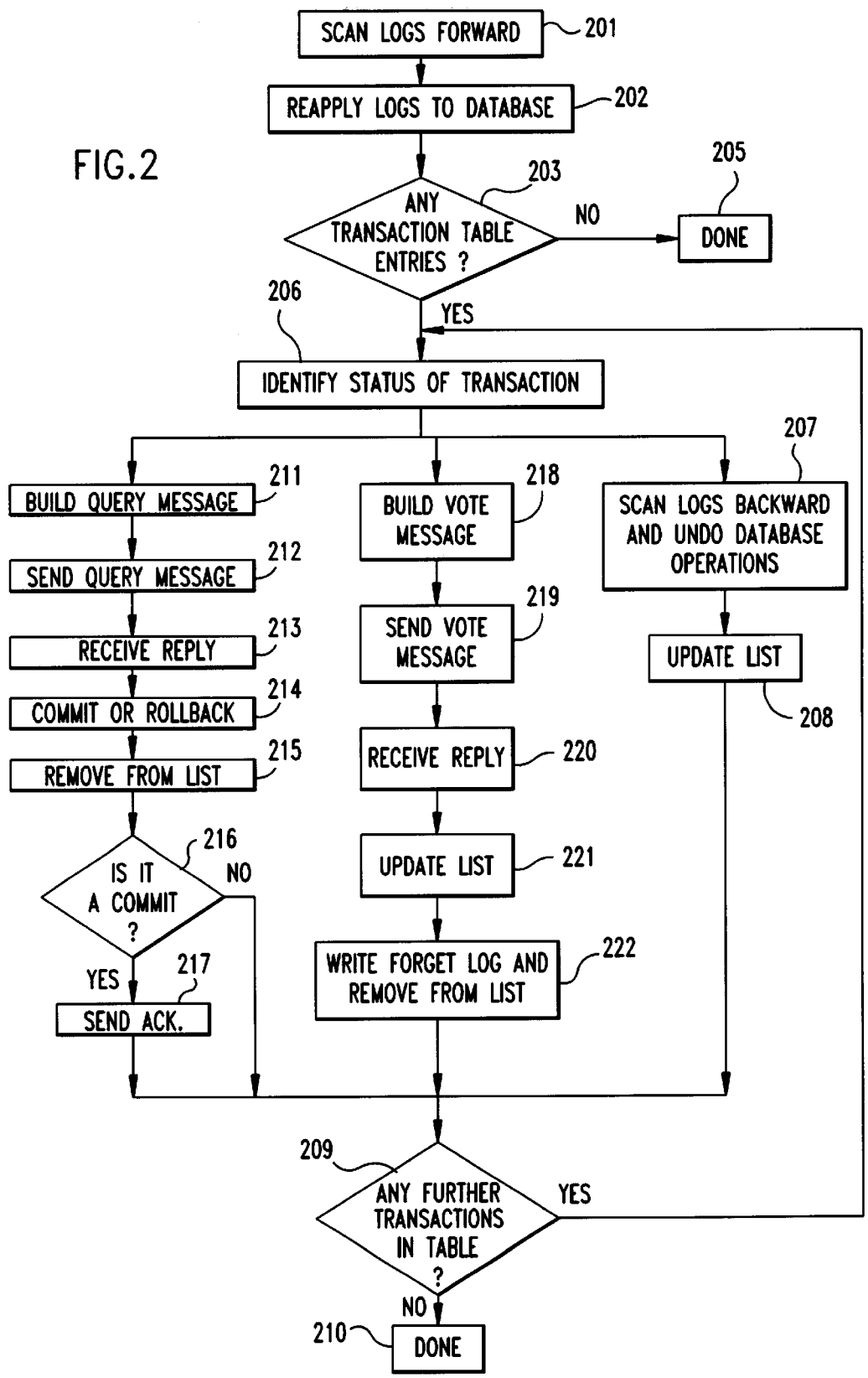
FIG. 2 provides a representative process flow of the processing conducted by the crash recovery agent utilizing the inventive crash recovery method.

The three phase process is representatively illustrated in FIG. 2. The forward recovery phase, steps 201–203 of FIG. 2, exactly parallels the forward recovery phase done in the prior art. It is in the backward recovery phase (steps 204–222 of FIG. 2) and the sideward recovery phase (see FIGS. 3a and 3b) that the inventive method is executed. In the backward recovery phase, the transaction table is consulted, at 204. If no transactions are listed, recovery is complete, as indicated at 205. If the table has entries, the transaction state which is stored in each of the transaction table entries is identified at 206.

If the state of a transaction is "prepared", such that the node is a participating node which had received a "prepare to commit" message from a coordinating node and was awaiting a "commit" message at the time of system failure, the transaction is identified as being in the "in doubt" state. When in doubt transactions are identified, a Query Message is built at step 211. The coordinating node number for the transaction is extracted from the Global Transaction ID which had been stored in the transaction table entry and is packaged with the destination node identifier and source process ID in a Query Message.

The query message block will be attached to a query message table entry which is indexed by the coordinating node. A query message table is statically created/allocated upon identification of a first in-doubt transaction, while query message blocks are dynamically allocated. The number of available slots for entries in a query message table will be equal to the number of nodes in the system. At step 212, the Query Message is sent to the destination node. For multi-node crash recovery, it is advantageous to assemble all message packets as table entries and coordinate distribution of messages, as discussed hereinafter; but, for the sake of clarity of description and succinctness, a single Query Message will be traced with reference to the backward recovery portion (steps 211–217 of FIG. 2) at the crash recovery agent and the sideward recovery portion (steps 310–319 of FIG. 3).

After the Query Message has been built, at 211, and sent, at 212, the crash recovery agent waits for a reply from the sideward recovery agent. The sideward recovery agent receives the Query Message at 310 and, using the Global Transaction ID, determines if the transaction is in its transaction table, at 311. If the transaction is not in the table, the sideward recovery agent/node will send an "abort/rollback" message at 312 to the crash recovery agent, and the processing by the sideward recovery agent is complete, as indicated at 313. If the transaction is located, a "commit" reply message is generated at 314. The sideward recovery agent then waits for an acknowledgement, at 315, and upon receipt of an acknowledgement from the crash recovery agent, at 316, updates the corresponding transaction table entry at 317. If the transaction is completed, as determined at 318, the transaction is removed from the transaction table, at 319. Given the possibility that more query messages may be directed to a given agent, if the transaction is not complete, the agent returns to 310 to wait for more query messages. For efficiency, different query message requests from different nodes may be served by multiple sideward recovery agents at a node.

Back at the crash recovery agent, once the reply message has been received, at 213, the crash recovery agent either commits or aborts the transactions, at step 214, removes the transaction from the list, at 215, and sends an acknowledgement at 217, if necessary as determined at step 216.

If the state of a transaction is "committed," it is concluded that the node is the coordinating node for the transaction and that the transaction has committed, but that not all acknowledgements had been received at the time of system failure. In that case, the transaction is identified as an "incomplete" transaction, at step 206, and a Vote Message is built at step 218. A Vote Message comprises the Global Transaction ID, a participant list of nodes to which the message is to be sent, a commit request, and the source process ID. As above, this message can be sent out individually, at step 219, or inserted into a "vote message block" which is attached to all vote message table entries for the participating nodes identified in the commit log. There is one entry per node in the vote message table. Similar to the query message table, the vote message table will be statically allocated upon identification of the first "committed" state, while each vote message block will be allocated dynamically, as needed.

Figure 3A:
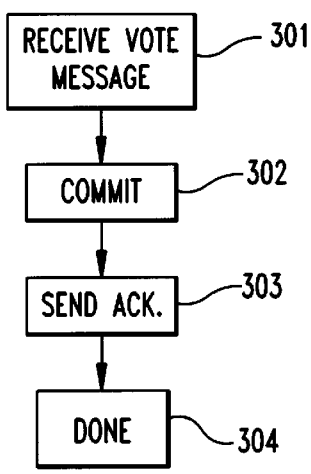
FIGS. 3a and 3b provide representative process flows of the alternative sideward recovery agent processing conducted in accordance with the inventive crash recovery method.
Figure 3B:
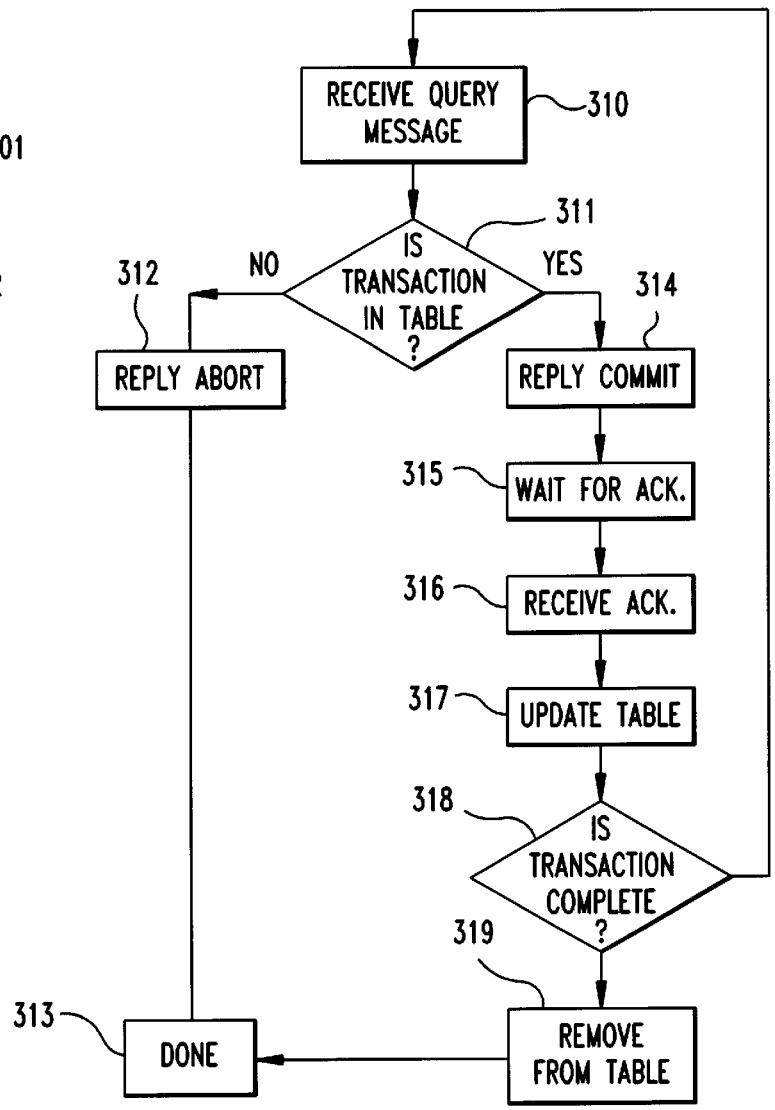

Tracking a single Vote Message, for succinctness and clarity of description, reference is made to steps 218–222 of FIG. 2 for the crash recovery agent (in this case, the coordinating node) and steps 301–305 of FIG. 3a for the sideward recovery agent. For the incomplete transaction, the Vote Message is built at 218 and sent at 219. The sideward recovery agent receives the Vote Message at 301 and executes a commit procedure at 302 as per the message contents. An acknowledgement is sent at step 303, and the sideward recovery agent processing is completed, as indicated at 304.

Back at the crash recovery agent, once the reply message has been received, the transaction list is updated at 221 and, assuming all necessary reply messages have been received, the transaction is written to the forget log and removed from the list at 222.

In the instance of "in flight" transactions, identified at step 206, the crash recovery agent scans the logs backwards and undoes the operations, at 207, then updates the list at 208. If no further entries are found in the transaction table, as ascertained at 209, the crash recovery is complete.

Since the multi-node model generally assumes more than one participating node per transaction, coordination of message sending, as well as reply receipt and processing, is preferably conducted to avoid the time and processor involvement of handling each message singly. Therefore, after all transaction table entries have been examined, the query message table and vote message table are processed. Any message blocks destined to the same node will be sent together. Query messages are generated to inquire about transactions outcomes for transactions which had been prepared but had not yet entered the second phase of the two-phase commit process at the time of failure. Vote messages are created to inform nodes of the transaction outcomes for transactions which had been committed but not yet forgotten when the system failed. After all message blocks have been sent, the crash recovery agent awaits replies for all of the generated messages.

For "vote" messages, the crash recovery agent will count the number of replies received for a given transaction. Assuming all replying nodes respond with commit acknowledgements, the crash recovery agent will generate a "forget" log, write the forget log to disk, and remove the corresponding transaction table entry.

For "query" message replies, if the transaction has not been the subject of a heuristic action (i.e., one involving human intervention, which could result in database inconsistency), the reply will be processed by the recovery agent as follows: (a) if the reply is "commit," the corresponding transaction will be committed and an acknowledgement will be sent to the coordinating node; or (b) if the reply is "abort," the corresponding transaction will be rolled back and no further communications will be sent. The transaction table entry is removed after commit or rollback processing has been completed.

In the instances wherein the transaction has been subjected to a heuristic action, query message replies will be processed differently from the foregoing process. If a mismatch has occurred, a warning message will be written to the system log. The message to the system log is to inform the system administrator that a database inconsistency has occurred. After writing the message, nothing more will be done by the crash recovery agent for that transaction; however, the system administrator may do something to fix the inconsistency, if possible. If no mismatch occurs, the reply will be discarded and nothing more (other than acknowledgement) would be done, since the "correct" action would have been done previously by the heuristic operation. Whether an acknowledgement is needed is determined by the underlying commit protocol. As previously noted, a "presume abort" protocol is assumed, whereby an acknowledgement is needed for the "commit" outcome and not needed for an "abort" outcome. If an acknowledgement is required, an acknowledgement is sent back and a heuristic forget operation is performed on each heuristically processed transaction. Acknowledgement is sent back to the transaction's original coordinating node, whereas heuristic forget operations are performed at the node that had done the heuristic operation (by the human administrator) to indicate that the heuristic operation performed had communicated with the coordinating node.

The sideward recovery phase is complete after all transactions in question are resolved. Database connection to the recovering database will be permitted after completion of the backward recovery process; however, the database will not be considered fully consistent until sideward recovery has been completed.

In a parallel database environment, it is possible that the same database could be restarted at more than one node by more than one application at the same time. It is also possible that a crash recovery operation could be initiated at more than one node as a result of the restart of the crashed system. To ensure data integrity across the nodes in a parallel database environment, a concurrent crash recovery strategy is also needed.

When multiple crash recovery operations against the same database are taking place on the system, one transaction may be processed at multiple nodes during the backward recovery phase. For example, query messages may be generated at participating nodes, while vote messages may be generated at the transaction coordinating node. When such a condition arises, there will be more than one agent trying to determine the transaction outcome at a given node. There can, however, be only one transaction outcome for any given transaction, such that a transaction cannot be committed at one node and rolled back at another node, rolled back partially, or rolled back repeatedly. The essence of concurrent crash recovery is to make sure that every transaction is either committed or aborted across all nodes.

The proposed concurrent crash recovery strategy for parallel environments is as follows: when a concurrent crash recovery is identified at the transaction coordinator node, the sideward recovery agent will not process any query message request for the transaction. On the other hand, when the condition is identified at a participating node, the sideward recovery agent at the node will process the vote message request and the crash recovery agent at the node will ignore the reply of the query message request. By dividing the roles, it is ensured that each transaction will not be handled more than once at any given node. For example, for a given transaction, the "vote message" can be generated at the coordinating node while a "query message" may be simultaneously generated at a participant node. When such "concurrent recovery" occurs, crash recovery agents at both nodes start sideward recovery. Assuming that Node 2 is the coordinating node, Node 1 (a participating node) sends a query message to Node 2 and Node 2 sends a vote message to Node 1. At Node 1, the sideward recovery agent will be assigned to serve the vote message from Node 2, and the agent will process the request and send back an acknowledgement. The crash recovery agent at Node 2 will write a forget log for the transaction when it has received back all acknowledgements. At Node 2, a sideward recovery agent will be assigned to serve the query message from Node 1. But, before it starts processing, the agent will check its transaction tables and log files and find that the crash recovery agent at Node 2 has sent a vote message to Node 1 for the same transaction. In that case, the agent will skip processing the query message and will return a special flag indicating that the request has been skipped. When the crash recovery agent at Node 1 receives a "skipped" reply, it simply ignores the reply and does nothing further on behalf of the transaction.

When a sideward recovery request is distributed to other nodes on a parallel system, it is possible that the local databases at the nodes may also require crash recovery. When this occurs, the process is referred to as cascaded crash recovery. Cascaded crash recovery is a complex issue. Since each node may have a different set of transactions to be resolved at the sideward recovery phase for a particular database, the scope of the transactions to be resolved over multiple nodes can be very large. Under the present invention, when a cascaded crash recovery is identified at a destination node, the agent serving the sideward recovery request at the destination node becomes a passive partner for the crash recovery agent at the other node. The sideward recovery agent goes through the first two phases of the crash recovery (i.e., forward and backward recovery) to construct the transaction table, but does not initiate a sideward recovery phase of its own. Rather, the agent serves the sideward recovery request received at the destination node and then exits. For a given recovery agent at a given node, when all sideward recovery requests have been processed and replies sent back, the crash recovery agent completes the third phase of recovery processing using the information received in the replies. After that, the recovery process at the node completes. It is entirely possible that other nodes in the parallel system may not have completed (or even started) the recovery process at this point. As noted above, however, selective access to the database at those nodes which have completed processing can be provided before all nodes have completed processing.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. A crash recovery method for database recovery in a multi-node computing environment wherein each node maintains at least one table of active transactions and at least one log file of operations performed, comprising:
   determining the status of said transactions at at least one node at the time of the crash; and
   updating the status of said transactions wherein said updating comprises completing at least one of said transactions by the steps comprising:
   generating a vote message to destination nodes comprising all participating nodes in said one transaction;
   gathering replies to said vote message from said destination nodes; and
   finalizing said transaction based upon said replies.

2. The method of claim 1 wherein said determining the status of transactions comprises referring to said table of transactions and identifying transaction status for each transaction based upon said entries in said table.

3. The method of claim 1 wherein said updating comprising undoing operations related to at least one of said operations.

4. The method of claim 1 wherein said at least one of said replies comprises an abort reply and wherein said finalizing said transaction comprises aborting said transaction.

5. The method of claim 1 wherein all of said replies comprise commit replies and wherein said finalizing said transaction comprises committing said transaction.

6. The method of claim 5 further comprising the step of writing a forget log message for said committed transaction.

7. The method of claim 9 wherein said recovery is conducted by the coordinating node for a given transaction.

8. The method of claim 1 wherein said updating comprises the steps of:
   conducting forward recovery on transactions having a first status;
   conducting backward recovery on transactions having a second status; and
   conducting sideward recovery on transactions having a third status.

9. The method of claim 8 wherein said forward recovery comprises redoing said transactions.

10. The method of claim 9 wherein said recovery is conducted by a participating node for a given transaction.

11. The method of claim 9 wherein said recovery is conducted by the coordinating node and at least one participating node for a given transaction.

12. The method of claim 8 wherein said backward recovery comprises aborting said transactions.

13. The method of claim 8 wherein said sideward recovery comprises completing said transactions.

14. The method of claim 13 wherein said completing comprises the steps of:
   generating a vote message to destination nodes comprising all participating nodes in said one transaction;
   gathering replies to said vote message from said destination nodes; and
   finalizing said transaction based upon said replies.

15. The method of claim 14 wherein said at least one of said replies comprises an abort reply and wherein said finalizing said transaction comprises aborting said transaction.

16. The method of claim 14 wherein all of said replies comprise commit replies and wherein said finalizing said transaction comprises committing said transaction.

17. The method of claim 16 further comprising the step of writing a forget log message for said committed transaction.

18. The method of claim 14 wherein said completing comprises:

generating a query message to the coordinating node for one of said transactions;

receiving a reply to said query message; and finalizing said one of said transactions based upon said reply.

19. A crash recovery method for database recovery in a multi-node computing environment wherein each node maintains at least one table of active transactions and at least one log file of operations performed, comprising:

determining the status of said transactions at at least one node at the time of the crash; and updating the status of said transactions wherein said updating comprises completing at least one of said transactions wherein said completing comprises:

generating a query message to the coordinating node for one of said transactions;

receiving a reply to said query message; and finalizing said one of said transactions based upon said reply.

20. A system for providing database recovery in each node of a multi-node computing system comprising:

means for assigning a transaction identifier to each transaction affecting said database;

at least one table of active transactions including said transaction identifier for each active transaction;

at least one log file of operations performed for each of said active transactions;

means for generating a request message, including a transaction identifier, to nodes participating in said transaction requesting transaction status from at least one other node on said multi-node system;

means for ascertaining the status of said transaction in response to said request message, said means for ascertaining comprising means for comparing said transaction identifier in said request message to at least one stored value; and means for communicating said status to said requesting node.

21. The system of claim 20 wherein said means for ascertaining the status of said transaction comprises means for comparing said transaction identifier in said request message to said at least one table.

22. The system of claim 20 wherein said means for ascertaining the status of said transaction comprises means for comparing said transaction identifier in said request message to said at least one log file.

* * * * *